(12) United States Patent
Montalvo et al.

(10) Patent No.: US 12,199,927 B2
(45) Date of Patent: *Jan. 14, 2025

(54) SINGLE LOCAL OSCILLATOR IN A MULTI-BAND FREQUENCY DIVISION DUPLEX TRANSCEIVER

(71) Applicant: Analog Devices International Unlimited Company, Limerick (IE)

(72) Inventors: Antonio Montalvo, Raleigh, NC (US); Michael Cobb, Hillsborough, NC (US); Qi Guo, Shanghai (CN); Hao Jing, Shanghai (CN)

(73) Assignee: Analog Devices International Unlimited Company, Limerick (IE)

( * ) Notice: Subject to any disclaimer, the term of this patent is extended or adjusted under 35 U.S.C. 154(b) by 340 days.

This patent is subject to a terminal disclaimer.

(21) Appl. No.: 17/320,998

(22) Filed: May 14, 2021

(65) Prior Publication Data

US 2021/0306128 A1 Sep. 30, 2021

Related U.S. Application Data

(63) Continuation of application No. 16/272,778, filed on Feb. 11, 2019, now Pat. No. 11,018,840.

(30) Foreign Application Priority Data

Jan. 17, 2019 (WO) ................ PCT/CN2019/072222

(51) Int. Cl.
*H04L 12/00* (2006.01)
*H04B 1/00* (2006.01)
*H04L 5/14* (2006.01)

(52) U.S. Cl.
CPC ............... *H04L 5/14* (2013.01); *H04B 1/005* (2013.01)

(58) Field of Classification Search
None
See application file for complete search history.

(56) References Cited

U.S. PATENT DOCUMENTS 5,983,088 A 11/1999 Aschwanden
6,282,413 B1 8/2001 Baltus
(Continued)

FOREIGN PATENT DOCUMENTS

CN 103001757 A 3/2013
CN 104469214 A 3/2015
(Continued)

OTHER PUBLICATIONS

Brannon, Where Zero-IF Wins: 50% Smaller PCB Footprint at 1/3 the Cost, Analog Dialogue 50-09, Sep. 2016, 7 pages.
(Continued)

*Primary Examiner* — Noel R Beharry
*Assistant Examiner* — Lionel Preval
(74) *Attorney, Agent, or Firm* — Knobbe, Martens, Olson & Bear, LLP

(57) ABSTRACT

Embodiments of the present disclosure relate to multi-band FDD transceivers. An example transceiver includes a LO, configured to generate a LO signal to be shared between a receiver and a transmitter of the transceiver. Both the receiver and the transmitter use quadrature signal processing and are configured to multi-band operation. Sharing a single LO to perform frequency conversion of different frequency bands of received and transmitted signals advantageously allows reducing the number of LOs used in a multi-band FDD transceiver.

20 Claims, 8 Drawing Sheets

(56) References Cited

U.S. PATENT DOCUMENTS

| | | | |
|---|---|---|---|
| 6,735,426 B1* | 5/2004 | Pau | H04B 1/406 455/76 |
| 7,424,066 B2 | 9/2008 | Montalvo et al. | |
| 7,856,048 B1 | 12/2010 | Smaini et al. | |
| 9,407,205 B2 | 8/2016 | Mahon et al. | |
| 9,634,717 B2 | 4/2017 | Zhai | |
| 10,111,280 B2 | 10/2018 | Montalvo et al. | |
| 11,018,840 B2 | 5/2021 | Montalvo et al. | |
| 2006/0281488 A1 | 12/2006 | Chang et al. | |
| 2007/0042802 A1* | 2/2007 | Park | H04B 1/006 455/552.1 |
| 2009/0156135 A1 | 6/2009 | Kamizuma et al. | |
| 2009/0253382 A1* | 10/2009 | Haralabidis | H04B 1/005 455/73 |
| 2011/0128992 A1* | 6/2011 | Maeda | H04L 27/3863 375/259 |
| 2011/0136443 A1 | 6/2011 | Milenkovic et al. | |
| 2012/0120992 A1* | 5/2012 | Soltanian | H03L 7/099 375/219 |
| 2013/0272175 A1 | 10/2013 | Zargari et al. | |
| 2015/0092636 A1 | 4/2015 | Rofougaran et al. | |
| 2015/0200690 A1 | 7/2015 | Youssef et al. | |
| 2017/0171791 A1* | 6/2017 | Li | H04W 36/06 |
| 2018/0198661 A1 | 7/2018 | Palmers et al. | |
| 2019/0097662 A1 | 3/2019 | Hornbuckle et al. | |
| 2020/0288431 A1 | 9/2020 | Lee et al. | |

FOREIGN PATENT DOCUMENTS

| | | |
|---|---|---|
| CN | 105981303 A | 9/2016 |
| WO | WO 2007/047364 | 4/2007 |
| WO | WO 2009/047736 A1 | 4/2009 |
| WO | WO 2017/161347 A | 9/2017 |

OTHER PUBLICATIONS

McLaurin et al., A Highly Reconfigurable 65nm CMOS RF-to-Bits Transceiver for Full-Band Multicarrier TDD/FDD 2G/3G/4G/5G Macro Basestations, ISSCC 2018, Session 9, Wireless Transceivers and Techniques, 9.3, 2018 IEEE International Solid-State Circuits Conference, 978-1-5090-4940-0/18 2018 IEEE, 3 pages.

Mathis, Architecture combines low- and zero-IF receivers, Institute for Communication Systems, University of Applied Sciences, EDN, Aug. 26, 2010, 5 pages.

Office Action dated Feb. 28, 2023 issued in Chinese Application No. 202010049978.2.

Office Action dated Dec. 12, 2023 in German Patent Application No. 102020100844.9.

* cited by examiner

SINGLE LOCAL OSCILLATOR IN A MULTI-BAND FREQUENCY DIVISION DUPLEX TRANSCEIVER

CROSS-REFERENCE TO RELATED APPLICATIONS

This application claims the benefit of and priority from PCT Application No. PCT/CN2019/072222 filed 17 Jan. 2019, entitled "SINGLE LOCAL OSCILLATOR IN A MULTI-BAND FREQUENCY DIVISION DUPLEX TRANSCEIVER", and U.S. patent application Ser. No. 16/272,778 filed 11 Feb. 2019, entitled "SINGLE LOCAL OSCILLATOR IN A MULTI-BAND FREQUENCY DIVISION DUPLEX TRANSCEIVER," both incorporated herein by reference in their entirety.

TECHNICAL FIELD OF THE DISCLOSURE

The present disclosure generally relates to radio frequency (RF) systems and, more particularly, to frequency division duplex (FDD) systems and components.

BACKGROUND

Radio systems are systems that transmit and receive signals in the form of electromagnetic waves in the RF range of approximately 3 kilohertz (kHz) to 300 gigahertz (GHz). Radio systems are commonly used for wireless communications, with cellular technology being a prominent example.

Cellular technology is constantly evolving to support growing widespread wireless technology usage. Recently, popular wireless standardized technology has progressed from Global System for Mobile Communication (GSM) to Wideband Code Division Multiple Access (WCDMA) to Long Term Evolution (LTE). Cellular systems are deployed in many frequency bands that are defined by a combination of standardization organizations such as the 3d Generation Partnership Project (3GPP) and government-sponsored agencies such as the Federal Communications Commission (FCC). There are both FDD and time division duplex (TDD) variants of frequency allocations that are used in commercial cellular networks. In FDD systems, the uplink and downlink use separate frequency bands at the same time while, in TDD systems, the uplink and downlink use the same frequencies at different times.

Base station transceivers capable of receiving multiple frequency bands with a single signal path (i.e., multi-band transceivers) have now become commonplace. These multi-band transceivers have the potential of advantageously lower cost and smaller size as compared to systems utilizing separate transceivers dedicated to each band.

As the foregoing illustrates, with all of the challenges of constantly evolving demands of wireless technology, designing an optimal RF transceiver, i.e., an RF device that can both send and receive RF signals having information encoded therein, is not trivial. One challenge with FDD transceivers supporting multi-band operation is the number of local oscillators (LO) used to downconvert received signals from RF to baseband (if direct conversion is used) or to an IF (intermediate frequency; if heterodyne conversion is used) and to, similarly upconvert signals to be transmitted. The number of LOs that have to be included in a system is important because LOs generally do not scale well in terms of power dissipation and chip area. Furthermore, as more and more components are integrated in a single integrated circuit (IC), generation and distribution of a LO signal is a major contributor to spurious issues to highly integrated RF ICs.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
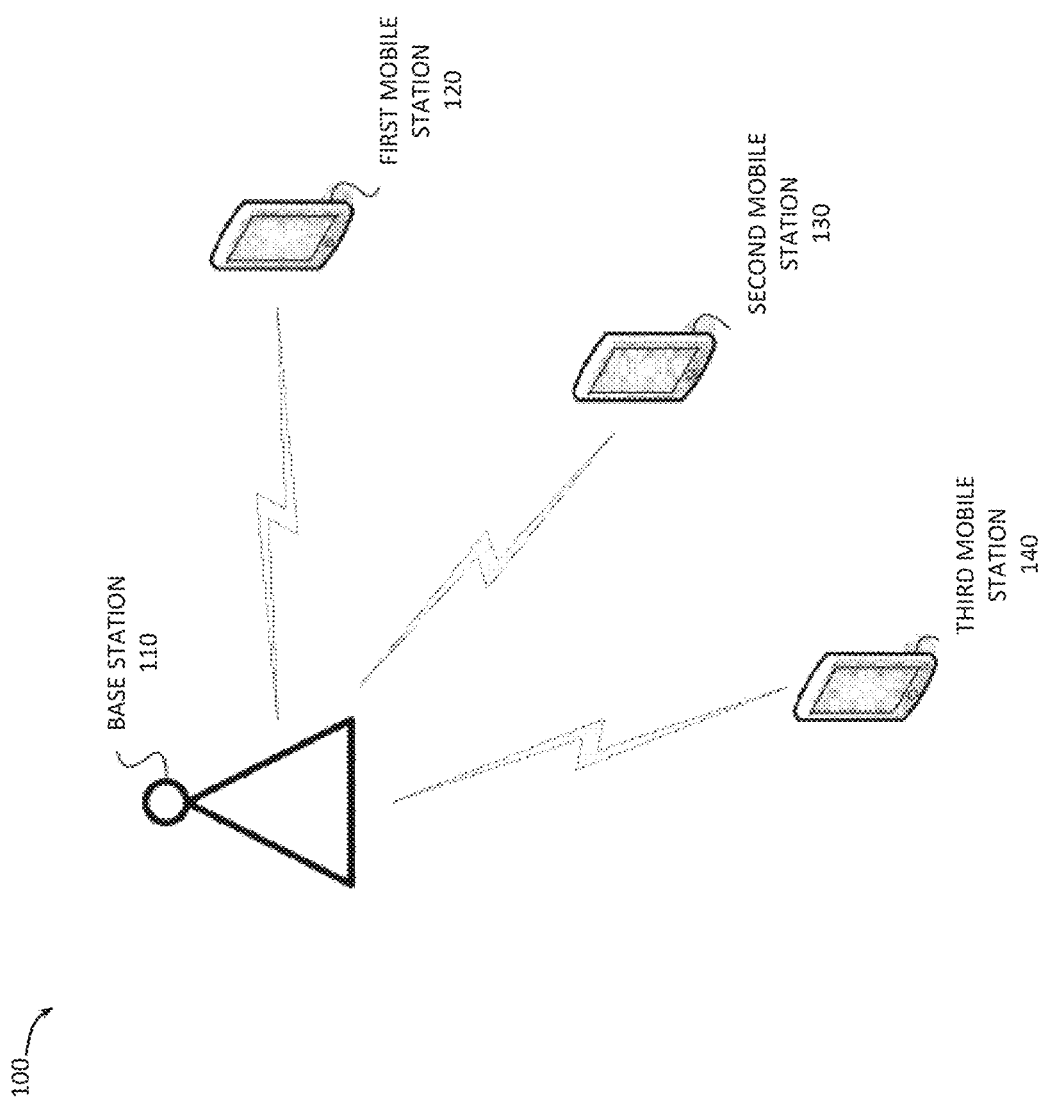
FIG. 1 illustrates an example wireless communication system, according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

Embodiments of the present disclosure relate to multi-band FDD transceivers. In one aspect, a multi-band FDD transceiver system includes a LO, configured to provide a LO signal to be shared between a receiver and a transmitter of the transceiver system, i.e., to be shared between an RX path and a TX path of the transceiver. Both the receiver and the transmitter use quadrature signal processing and are configured to multi-band operation. The RX path includes a RX path mixer (also commonly known as a "downconverter"), configured to mix the LO signal with an RX signal to generate a mixed RX signal, where the RX signal includes a first RX signal component in a first band of RX frequencies and a second RX signal component in a second band of RX frequencies, the second band of RX frequencies being non-overlapping and non-continuous with the first band of RX frequencies. The TX path includes a TX path mixer (also commonly known as an "upconverter"), configured to mix the LO signal with a TX signal to generate a mixed TX signal, where the mixed TX signal includes a first TX signal component in a first band of TX frequencies and a second TX signal component in a second band of TX frequencies, the second band of TX frequencies being non-overlapping and non-continuous with each one of the first band of TX frequencies, the first band of RX frequencies, and the second band of RX frequencies. Sharing a single LO to perform frequency conversion of different frequency bands of RX and TX signals advantageously allows reducing the number of LOs used in an FDD transceiver.

As will be appreciated by one skilled in the art, aspects of the present disclosure, in particular aspects of sharing a single LO for frequency conversion of various signal components in RX and TX paths of a multi-band FDD transceiver as described herein, may be embodied in various manners—e.g., as a method, a system, a computer program product, or a computer-readable storage medium. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of any methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing RF transceivers and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The description may use the phrases "in an embodiment" or "in embodiments," which may each refer to one or more of the same or different embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. Various aspects of the illustrative embodiments are described using terms commonly employed by those skilled in the art to convey the substance of their work to others skilled in the art. The terms "substantially," "approximately," "about," etc., may be used to generally refer to being within +/−20% of a target value based on the context of a particular value as described herein or as known in the art. For the purposes of the present disclosure, the phrase "A and/or B" or notation "A/B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A, B, and/or C).

Example Wireless Communication System

FIG. 1 illustrates a wireless communication system 100, according to some embodiments of the present disclosure. The wireless communication system 100 may include a base station 110 and a plurality of mobile stations, examples of which are shown in FIG. 1 as a first mobile station 120, a second mobile station 130, and a third mobile station 140. The base station 110 may be coupled to backend network (not shown) of the wireless communication system and may provide communication between the mobile stations 120-140 and the backend network. In various embodiments, the wireless communication system 100 may include a plurality of base stations similar to the base station 110, which base stations may, e.g., be arranged in cells, where only one base station 110 is shown in FIG. 1 for simplicity and illustration purposes.

The wireless communication system 100 may support multiple standards and multiple band communication. For example, the wireless communication system may support LTE, WCDMA, and GSM standard communication. Each of the mobile stations 120-140 may support any one or more of these standards. However, the use of these listed standards is merely exemplary and other standards also may be supported by different parts of the wireless communication system 100. In addition to multiple standard capabilities, the wireless communication system 100 may also support multiple communication bands. For example, the wireless communication system 100 may support DCS/PCS bands and GSM850/GSM900 bands of GSM.

The multiple standard, multiple band signals that are transmitted and received in the base station 110 of the wireless communication system 100 may be classified into two groups. A first group may refer to the signals for which direct conversion may be applicable, and a second group may refer to the signals for which direct conversion may not applicable. In the FIG. 1 example described above, LTE and WCDMA may fall in the first group for which direct conversion is applicable in a base station, and GSM may fall in the second group for which direct conversion is not applicable in a base station. Although direct conversion provides benefits such as low system cost, improved out-of-band performance, low power dissipation, and low component cost, some standard performance requirements are not feasible with direct conversion. For example, since a received RF signal is mixed directly to base band in direct conversion, harmonic distortions and images may fall in band. And while some standard performance requirements may be sufficiently low for direct conversion applications such as LTE and WCDMA that require approximately 70 dB image and harmonic rejection, other systems may require higher performance not feasible with direct conversion such as MC-GSM that requires 90 dB rejection.

The base station 110 may support wireless communication with mobile stations 120-140 of various standard technologies as well as in multiple bands. The base station 110 may transmit signals to the mobile stations 120-140 in downlink signals and receive signals from the mobile stations 120-140 in uplink signals. For example, the base station 110 may receive LTE compliant signals from the first mobile station 120, WCDMA signals from the second mobile station 130, and GSM signals from the third mobile station 140. The base station 110 may convert the received signals to baseband signals, possibly by first converting them to IF signals, or low-IF signals, to demodulate and extract information from therein.

Example Multi-Band FDD Transceiver

Figure 2:
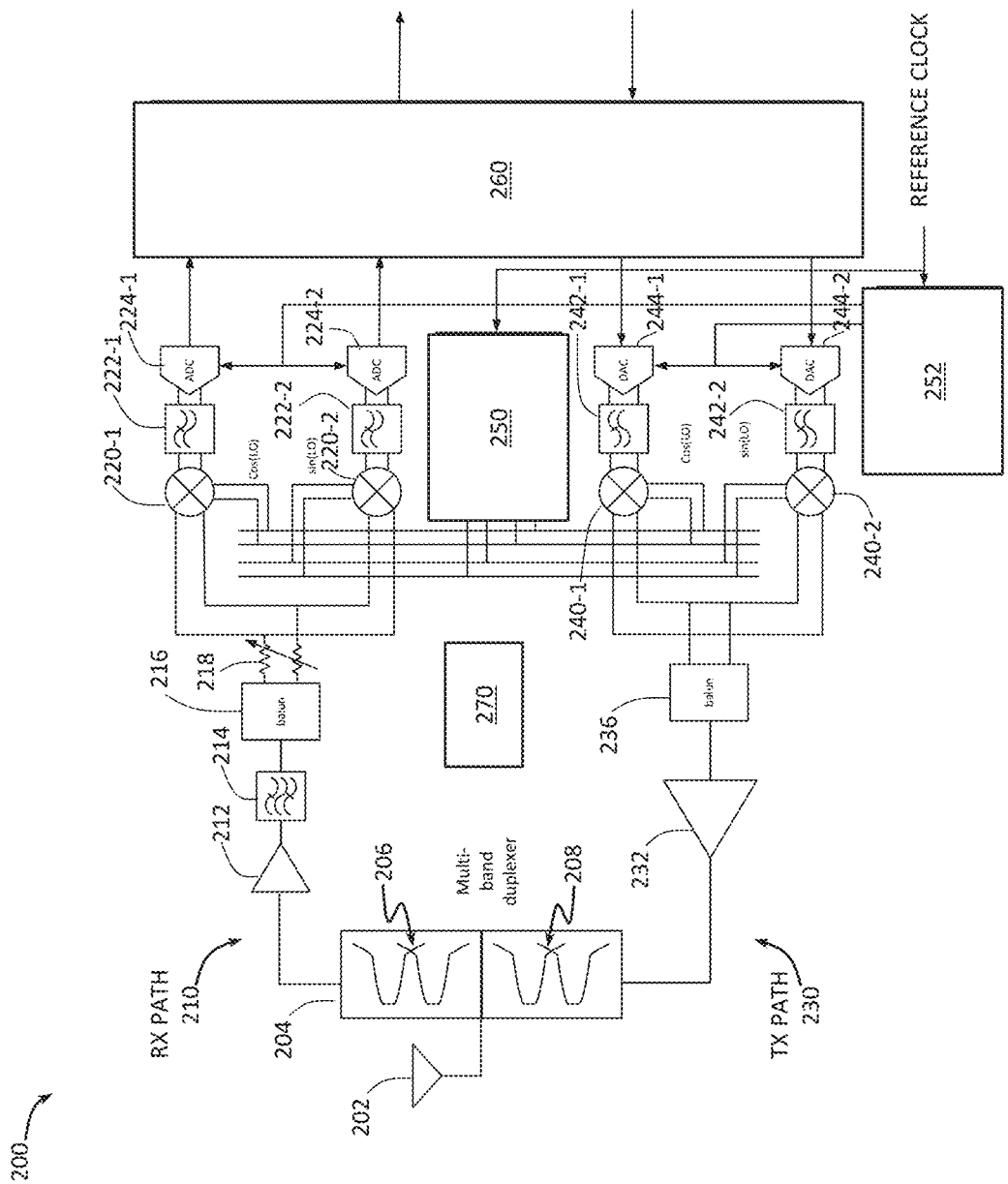
FIG. 2 provides a block diagram illustrating an example RF transceiver, according to some embodiments of the present disclosure.

FIG. 2 is a simplified block diagram of an RF transceiver 200, according to some embodiments of the present disclosure. For example, the transceiver 200 may be provided in the base station 110 of FIG. 1. In another example, the transceiver 200 may be provided in any of the mobile stations 120-140 of FIG. 1. The transceiver 200 may support both aforementioned groups of signals-signals for which direct conversion is applicable (e.g., LTE, WCDMA) and signals for which direct conversion is not applicable (e.g., MC-GSM). Accordingly, the transceiver 200 may be set to provide direct conversion for the first group of signals or to provide low-IF conversion for the second group of signals (and first group) using common circuit components as a single monolithic transceiver.

As shown in FIG. 2, the transceiver 200 may include an antenna 202. Because the transceiver 200 is an FDD transceiver, the antenna 202 may be configured for concurrent reception and transmission of communication signals in separate, i.e., non-overlapping and non-continuous, bands of frequencies, e.g., in bands having a separation of, for example, several megahertz (MHz) from one another. Because the transceiver 200 is a multi-band transceiver, the antenna 202 is configured for concurrent reception of signals having multiple components in separate frequency bands, i.e., a given signal received by the antenna 202 may be seen as a wideband signal that may include a plurality of RX signal components in different bands. Similarly, the antenna 202 is configured for concurrent transmission of signals having multiple components in separate frequency bands, i.e., a given signal transmitted by the antenna 202 may be seen as a wideband signal that may include a plurality of TX signal components in different bands. In various embodiments, the antenna 202 may be a single wideband antenna or a plurality of band-specific antennas (i.e., a plurality of antennas each configured to receive and transmit signals in a specific band of frequencies).

As also shown in FIG. 2, an output of the antenna 202 may be coupled to the input of a multi-band FDD duplexer 204. The multi-band FDD duplexer 204 is an electromagnetic component configured for filtering multiple signals to allow for bidirectional communication over a single path between the duplexer 204 and the antenna 202. To that end, the duplexer 204 may be configured for providing RX signals to a receiver of the multi-band FDD transceiver 200, the receiver illustrated in FIG. 2 with a RX path 210, and for receiving TX signals from a transmitter of the multi-band FDD transceiver 200, the transmitter illustrated in FIG. 2 with a TX path 230.

The multi-band nature of the receiver of the FDD transceiver 200, i.e., the fact that each of the RX signals may have RX signal components in separate frequency bands, is schematically illustrated in FIG. 2 with multiple RX signal peaks 206 shown in the RX path 210. Similarly, the multi-band nature of the transmitter of the FDD receiver 200, i.e., the fact that each of the TX signals may have TX signal components in separate frequency bands, is schematically illustrated in FIG. 2 with multiple TX signal peaks 208. Thus, each of the RX path 210 and the TX path 230 is configured to operate in multiple bands simultaneously. For example, 3GPP FDD bands currently have bandwidths ranging from 10 MHz to more than 75 MHz, and the transceiver 200 may be configured to support any and all of these bands that fall within the transceiver bandwidth, TRxBW. In various embodiments, TRxBW may range from less than 100 MHz to more than 1 GHz.

The RX path 210 provides an example of one receiver circuit that may be included in the transceiver 200, and the TX path 230 provides an example of one transmitter circuit that may be included in the transceiver 200. In other embodiments, multiple receiver circuits and/or multiple transmitter circuits may be included in the transceiver 200, with only one of each shown in FIG. 2 for simplicity and illustration purposes. For example, in some embodiments, the transceiver 200 may include any number between 2 and 64 of the RX paths 210 and any number between 2 and 64 of the TX paths 230.

FIG. 2 further illustrates a LO 250 (which may also be referred to as a "LO quadrature generator" 250), configured to provide LO signals to both the RX path 210 and the TX path 230. Namely, as described in greater detail below, the LO 250 is configured to provide an LO signal to the quadrature mixer 220 in the RX path 210, and to provide the same LO signal to the quadrature mixer 240 in the TX path 230. Assuming that the bandwidth of the transceiver 200 is denoted as TRxBW and the frequency of the oscillation signal generated by the LO 250 is denoted as LO, on the RX path 210, a multi-band signal received by the antenna 202 and including signal components in a range of RF frequencies from LO−TRxBW/2 to LO+TRxBW/2 is downconverted (using the LO signal and the RX quadrature mixer 220, as described below) to a complex signal ranging, in frequencies, from −TRxBW/2 to TRxBW/2, to be converted to digital form. On the other hand, on the TX path 230, a multi-band signal of bandwidth TRxBW, as received by the TX quadrature mixer 240, is upconverted (using the LO signal and the TX quadrature mixer 240, as described below) to a range of RF frequencies from LO−TRxBW/2 to LO+TRxBW/2, to be transmitted by the antenna 202.

In some embodiments, the LO 250 may include a phase lock loop (PLL) and an oscillator. The LO 250 may generate LO signals at different frequencies. The different frequencies may be selected based, e.g., on the current signal properties for multi-band RX and TX signals and frequency bands included therein.

Figure 8:
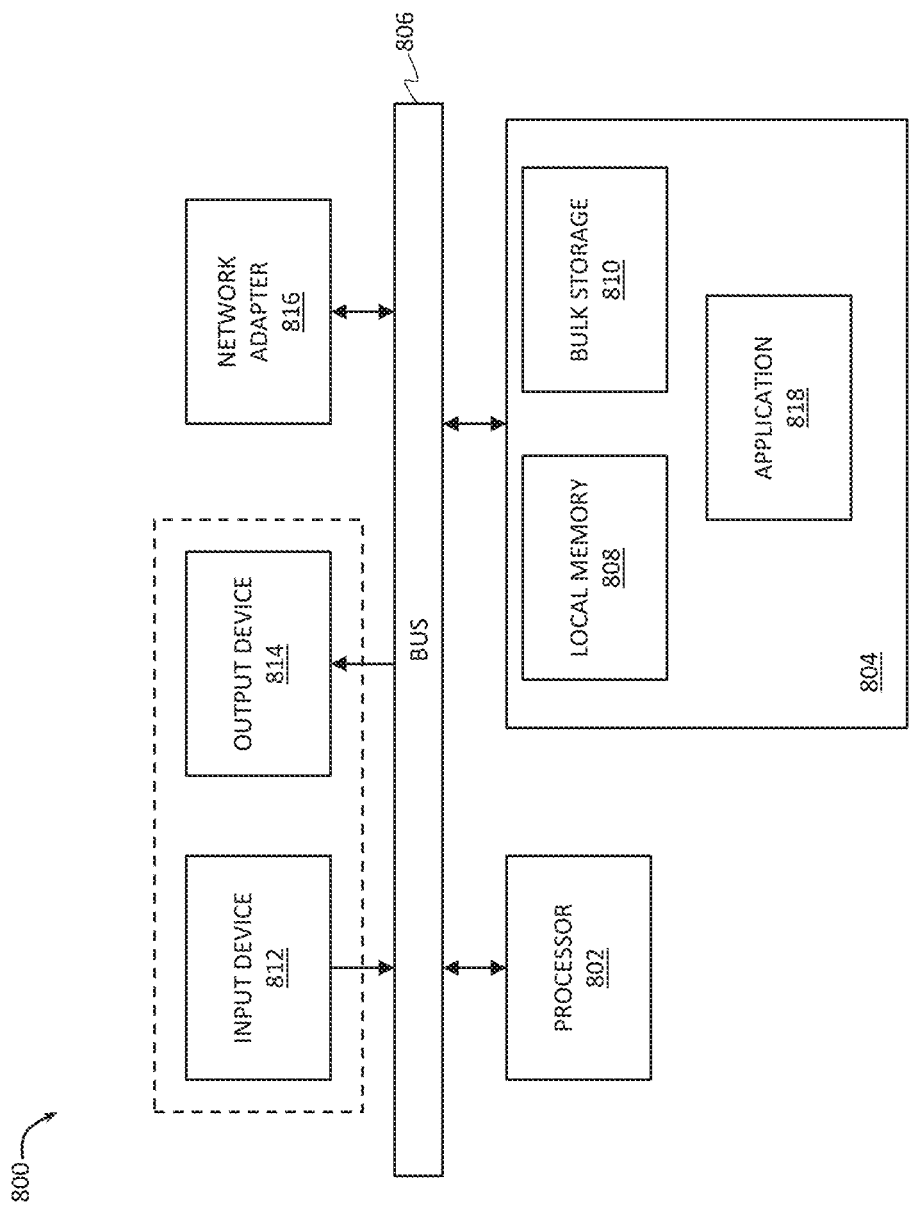
FIG. 8 provides a block diagram illustrating an example data processing system that may be configured to implement at least portions of the method shown in FIG. 8, according to some embodiments of the present disclosure.

At least some parts of the functionality of the LO 250, e.g., the frequency of the oscillation signal generated by the LO 250, may be controlled by a controller 270 which may either be included within the transceiver 200, or be external, but communicatively coupled, to the transceiver 200. In some embodiments, the controller 270 may further control other aspects, components, and features of the transceiver 200, described herein. Exemplary data processing system which may be used to implement the controller 270 is shown in FIG. 8.

Turning to the details of the RX path 210, as shown in FIG. 2, the RX path 210 may include a low-noise amplifier (LNA) 212, a harmonic or band-pass filter 214, a transformer 216, a variable attenuator 218, a pair of RX path mixers 220-1 and 220-2, a pair of filters 222-1 and 222-2, and a pair of analog-to-digital converters (ADCs) 224-1 and 224-2. Two or more components of the RX path 210 may be provided on a monolithically IC.

An input of the LNA 212 may be coupled to an antenna port (not shown) of the antenna 202 (via the duplexer 204), which, in turn, may be coupled to the antenna 202. The antenna 202 may receive RF signals in different bands, and the LNA 212 may amplify the received RF signals. The LNA 212 may be coupled to the harmonic or band-pass filter 214 that may filter received RF signals that have been amplified by the LNA 212.

The harmonic or band-pass filter 214 may be coupled to the transformer 216. In some embodiments, the transformer 216 may be provided as a balun matching transformer. The transformer 216 may convert the received signal into a balanced signal (i.e., two out-of-phase signals), thus providing a conversion from a single-ended transmission line to a differential transmission line. The balanced side of the transformer 216 may be coupled to the input variable attenuator 218.

The input variable attenuator 218 may be coupled to the pair of RX path mixers 220-1 and 220-2 (which, together, may be referred to as an "RX quadrature mixer 220" or a "downconverter 200"). Each of the RX path mixers 220-1 and 220-2 may include two inputs and one output. A first input may receive the RX signals, which may be current signals, from both balanced nodes of the input variable attenuator 218. A second input of each of the RX path mixers 220-1 and 220-2 may be coupled the output of the LO 250 so that each of the RX path mixers 220-1 and 220-2 can receive the LO signal generated by the LO 250 and use it for downconverting.

The RX path 210 of the transceiver 200 may receive and downconvert signals employing different downconversion techniques—direct downconversion and low-IF downconversion, e.g., based the mode selection as described in co-pending US 2016/0100455A1. To that end, for first grouped signals, the RX path mixers 220-1 and 220-2 may downconvert the received RF signals directly to baseband signals, which may be substantially at or near 0 Hz. On the other hand, for second grouped signals, the RX path mixers 220-1 and 220-2 may downconvert the RF signals to low-IF signals. For example, the low-IF signals may be substantially at or near about 10 MHz. The first RX path mixer 220-1 may generate an in-phase (I) downconverted RX signal by mixing the RX signal received from the transformer 216 and an in-phase component of the LO signal (i.e., cos (LO), labeled in FIG. 2 at the second input to the first RX path mixer 220-1). The output of the first RX path mixer 220-1 may be provided to an I-signal path. The second RX path mixer 220-2 may generate a quadrature phase (Q) downconverted signal by mixing the RX signal received from the transformer 216 and a quadrature component of the LO signal (i.e., sin (LO), labeled in FIG. 2 at the second input to the second RX path mixer 220-2, which is a component that is offset in phase from the in-phase component of the LO signal by 90 degrees). The output of the second RX path mixer 220-2 may be provided to a Q-signal path, which may be substantially 90 degrees out of phase with the I-signal path.

The outputs of the RX path mixers 220-1 and 220-2 may, optionally, be coupled to respective filters 222-1 and 222-2, which may be low-pass filters, configured to filter out, from the mixed RX signals output by the mixers 220-1 and 220-2, the signal components above a certain frequency. The mixed RX signals from the RX quadrature mixer 220 may then be provided to a quadrature ADC 224 that, similar to the RX quadrature mixer 220, includes two ADCs 224-1 and 224-2, configured to digitize the downconverted RX path signals. The ADCs 224-1 and 224-2 may accommodate both the downconverted baseband signals belonging to the first group and, alternatively, the downconverted IF signals belonging to the second group. In some embodiments, the controller 270 may adjust the bandwidth of ADCs 224-1 and 224-2 based on the mode select.

The outputs of the RX path ADCs 224-1 and 224-2 may be provided to a digital block 260, configured to perform various functions related to digital processing of the RX signals so that information encoded in the RX signals can be extracted. Such functions may include decimation (downsampling), quadrature error correction, digital downconversion, DC offset cancellation, automatic gain control, etc. In some embodiments, the digital block 260 may include a Hilbert filter (not shown), configured to receive the digital mixed RX signal in the Q-signal path (i.e., digitized output generated by the ADC 224-2), shift the Q-signal by 90 degrees and perform a Fourier Transform. The output of such a Hilbert filter may then be summed with the digital output in the I-signal path of the RX path 210 (i.e., output digitized by the ADC 224-1) by a summer (not shown), which may output an analytic baseband signal from which information may be extracted. The summer output may be coupled to a baseband processor, which may extract the information. For direct conversion operations, such a Hilbert filer may be bypassed.

Turning now to the TX path 230, as shown in FIG. 2, the TX path 230 may include a power amplifier (PA) 232, a transformer 236, a TX path quadrature mixer (or "upconverter") 240 that includes a pair of TX path mixers 240-1 and 240-2, a pair of filters 242-1 and 242-2, and a pair of digital-to-analog converters (DACs) 244-1 and 244-2. Two or more components of the TX path 230 may be provided on a monolithically IC, which may either be the same or a different circuit from the one that may include two or more components of the RX path 210.

The quadrature digital signal to be transmitted (TX signal) may be provided, from the digital block 260, to the DACs 244-1 and 244-2, configured to convert, respectively, digital I- and Q-path TX signal components to analog form. Optionally, the outputs of the DACs 244-1 and 244-2 may be coupled to respective filters 242-1 and 242-2, which may be band-pass filters, configured to filter out, from the analog TX signals output by the DACs 244-1 and 244-2, the signal components outside of the desired band. The digital TX signals may then be provided to the TX path quadrature mixer 240 that includes a pair of TX path mixers 240-1 and 240-2.

Similar to the mixers 220-1 and 220-2 included in the RX path 210, each of the TX path mixers 240-1 and 240-2 may include two inputs and one output. A first input may receive the TX signal components, converted to the analog form by the respective DAC 244, which are to be upconverted to generate RF signals to be transmitted. The first TX path mixer 240-1 may generate an in-phase (I) upconverted signal by mixing the TX signal component converted to analog form by the DAC 244-1 with the in-phase component of the LO signal (i.e., cos (LO), labeled in FIG. 2 at the second input to the first TX path mixer 240-1). The second TX path mixer 240-2 may generate a quadrature phase (Q) upconverted signal by mixing the TX signal component converted to analog form by the DAC 244-2 with the quadrature component of the LO signal (i.e., sin (LO), labeled in FIG. 2 at the second input to the second TX path mixer 240-2, which, as described above, is a component that is offset in phase from the in-phase component of the LO signal by 90 degrees). The output of the second TX path mixer 240-2 is added to the output of the first TX path mixer 240-1 to create a real RF signal. A second input of each of the TX path TX path mixers 240-1 and 240-2 may be coupled the LO 250, which is the same LO as the one providing oscillation signals to the RX path 210, as described in greater detail below.

The outputs of the TX path mixers 240-1 and 240-2 may be coupled to the transformer 236, which may be provided as a balun matching transformer, configured to convert the differential signal to a single-ended signal.

An output of the transformer 236 may be coupled to an input of the PA 232, and the output of the PA 232 may be coupled to an antenna port (not shown) of the antenna 202 (via the duplexer 204), and, thereby coupled to the antenna 202. The PA 232 may amplify the mixed TX signals to be transmitted by the transceiver 200, and the antenna 202 may transmit the amplified TX signals.

FIG. 2 further illustrates a clock generator 252, which may, e.g., include a suitable PLL, configured to receive a reference clock signal and use it to generate a different clock signal which may then be used for timing the operation of the ADCs 224, DACs 244, and/or which may also be used by the LO 250 to generate the LO signal to be used by the RX quadrature mixer 220 and the TX quadrature mixer 240. In other embodiments, the LO 250 may receive a different reference clock signal (not shown), i.e., not the one used for clocking the ADCs 224 and DACs 244, for generating the LO signal from.

The transceiver 200 provides a simplified version and, in further embodiments, other components not specifically shown in FIG. 2 may be included. For example, the RX path 210 may include a pair of current-to-voltage amplifiers between the RX path mixers 220-1, 220-2 and respective ADCs 224-1, 224-2, which amplifiers may amplify and convert the downconverted signals to voltage signals and which, optionally, may have bandwidth that is tunable by the controller 270 to accommodate both the downconverted baseband signals belonging to the first group or, alternatively, the downconverted IF signals belonging to the second group.

Furthermore, in various embodiments, the digital block 260 may include separate digital blocks for processing received signals and signals to be transmitted.

Sharing a Single LO in a Multi-Band FDD Setting

Embodiments of the present disclosure are based on recognition that, in a multi-band transceiver setting, signal components of separate frequency bands may be viewed as signal components of a given multi-band signal having wide bandwidth, the term "wide" used to reflect the fact that the bandwidth of a combination of signal components of separate frequency bands is wider than a bandwidth of each of the signal component. Embodiments of the present disclosure are further based on recognition that a single LO signal may be used to downconvert multiple signal components of a multi-band RX signal and to upconvert multiple signal components of a multi-band TX signal.

Various example scenarios of how a frequency of the LO signal may be selected with respect to the frequencies of the different RX and TX bands with which the transceiver 200 may operate are illustrated in FIGS. 3-6. Each of these figures illustrates the frequency placement of the LO signal as generated by the LO 250, and separate frequency bands of the multi-band RX and TX signals as may be, respectively, received and transmitted by the antenna 202. Thus, the x-axis of each of FIGS. 3-6 is used to show frequency values, measured in MHz, while the y-axis of each of FIGS. 3-6 is a somewhat arbitrary illustration of the amplitude of the signals, showing that, in general, the downlink operating bands (i.e., TX signals) are usually larger in amplitude than the uplink operating bands (i.e., the RX signals), and both are larger than the amplitude of the LO signal generated by the LO 250.

Figure 3:
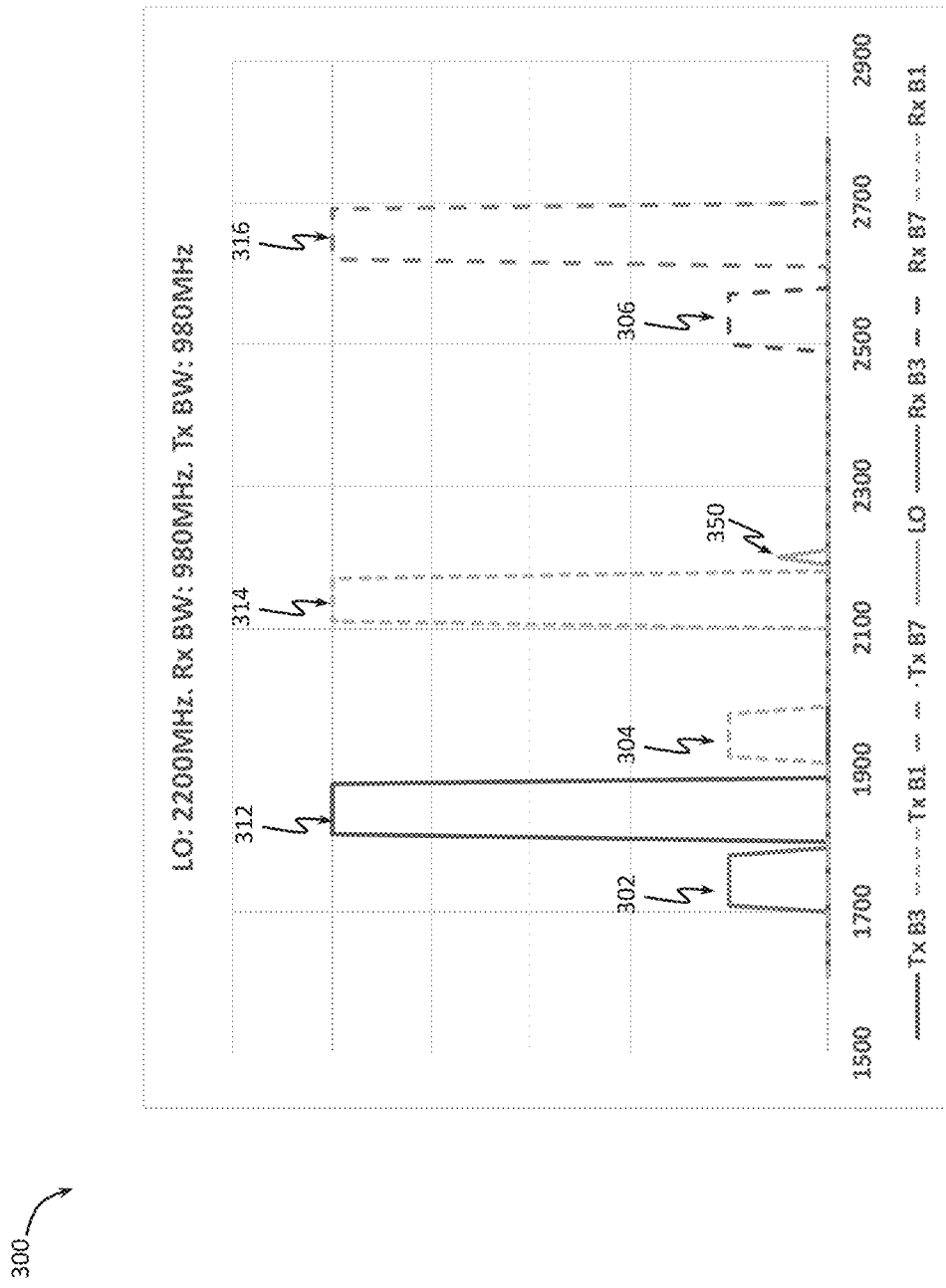
FIG. 3 provides an illustration of using a single LO for receiving and transmitting signals in multiple receive (RX) and transmit (TX) bands, according to some embodiments of the present disclosure.

What may be considered to be a general scenario is illustrated in a graph 300 shown in FIG. 3, illustrating that, in general, the frequency of the LO signal generated by the LO 250 may be anywhere with respect to the RF bands of the multi-band RX and TX signals. FIG. 3 illustrates a multi-band RF RX signal as a signal having RX signal components 302, 304, and 306. FIG. 3 illustrates a multi-band RF TX signal as a signal having TX signal components 312, 314, and 316. FIG. 3 further illustrates the LO signal 350.

The desired bands of the multi-band RX and TX signals shown in FIG. 3 are 3GPP bands 1, 3 and 7. Namely, the RX signal component 302 illustrates a signal in the uplink (i.e., the base station receives and the user equipment transmits) operating band 3 (Rx B3), while the TX signal component 312 illustrates a signal in the downlink (i.e., the base station transmits and the user equipment receives) operating band 3 (Tx B3); the RX signal component 304 illustrates a signal in the uplink operating band 1 (Rx B1), while the TX signal component 314 illustrates a signal in the downlink operating band 1 (Tx B1); and the RX signal component 306 illustrates a signal in the uplink operating band 7 (Rx B7), while the TX signal component 316 illustrates a signal in the downlink operating band 7 (Tx B7). As can be seen from FIG. 3, or derived from the list of 3GPP bands, for the example shown in FIG. 3, the span of frequencies from the bottom of the lowest band (i.e., from the bottom of Rx B3) to the top of the highest band (i.e., to the top of Tx B7) is 980 MHZ, which, for this example is the minimum transceiver bandwidth that may be used for the transceiver 200, TR×BW. For the operating bands as shown in FIG. 3, the LO signal 350 generated by the LO 250 may be selected to be placed at the frequency of 2.2 GHZ.

In the example of FIG. 3, the transmitter (i.e., the TX path 230 of the transceiver 200) may upconvert a wideband signal (i.e., the signal that includes signal components which, after the upconversion, will become the TX signal components 312, 314, and 316) of a 980 MHz span of frequencies centered on DC to the three bands (i.e., 3GPP bands 1, 3, and 7) as shown in FIG. 3 with the TX signal components 312, 314, and 316, using a single LO 250 generating an oscillation signal 350 with the frequency of 2.2 GHZ. Similarly, the receiver (i.e., the RX path 210 of the transceiver 200) may downconvert a wideband RF RX signal (i.e., the signal that includes the RX signal components 302, 304, and 306) to a 980 MHz span centered on DC.

For the example shown in FIG. 3, the transceiver 200 may operate as follows. The LO 250 generates the LO signal 350. The RX quadrature mixer 220 mixes the LO signal 350 with the multi-band RF RX signal that includes the RX signal components 302, 304, and 306 (i.e., components in three separate bands of RF RX frequencies) to generate a downconverted RX signal (not shown in FIG. 3) which is then provided to the ADC 224 for conversion to digital. The downconverted RX signal is also a multi-band signal, i.e., it also includes signal components in three separate bands, but each of the signal components 302, 304, 306 are shifted down by the frequency LO, so that the downconverted RX signal is a signal of bandwidth TR×BW centered at DC (i.e., the downconverted RX signal is a signal ranging from −490 MHz, which is −TR×BW/2 for the example of FIGS. 3, to 490 MHz, which is TR×BW/2 for the example of FIG. 3). The TX quadrature mixer 240 mixes the same LO signal 350 with a TX signal (not shown in FIG. 3) to generate an upconverted multi-band RF TX signal that includes the TX signal components 312, 314, and 316 (i.e., components in three separate bands of RF TX frequencies), which upconverted TX signal is then provided to the antenna 202 for the transmission. Similar to the upconverted TX signal shown in FIG. 3 with the signal components 312, 314, and 316, the TX signal prior to upconversion (i.e., the signal which is not shown in FIG. 3) is also a multi-band signal, i.e., it also includes signal components in three separate bands, but the TX signal prior to upconversion is a signal of bandwidth TRxBW centered at DC (i.e., the TX signal prior to conversion is a signal ranging from −490 MHz to 490 MHz for the example of FIG. 3). The TX quadrature mixer 240 shifts each of the signal components of the TX signal prior to conversion up by the frequency LO to generate the upconverted RF TX signal with the signal components 312, 314, and 316 as shown in FIG. 3. Because in the example of FIG. 3 the LO signal 350 does not overlap or is included in any of the RF bands, the downconverted RX signal components and TX signal components prior to the upconversion are low-IF signals.

Figure 4:
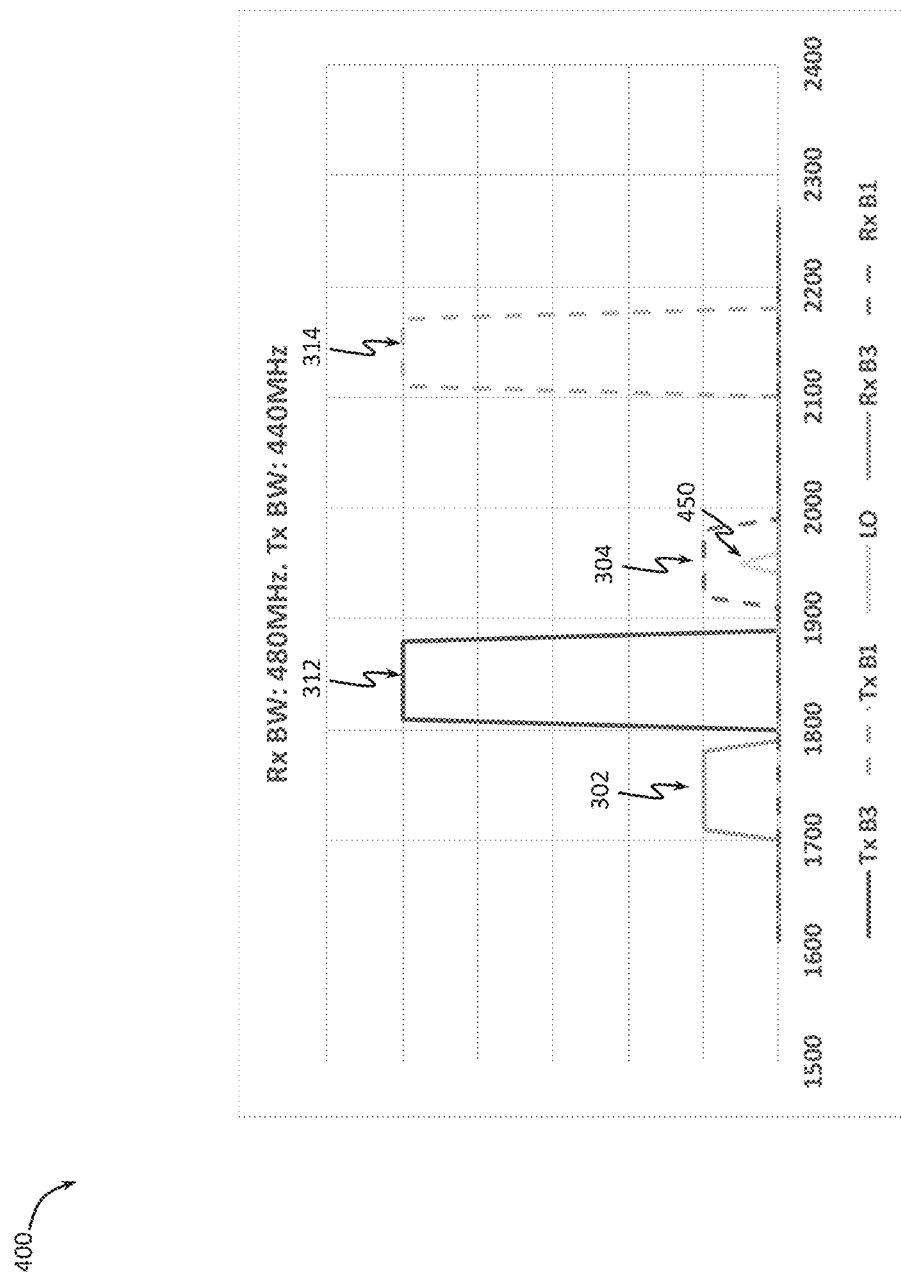
FIG. 4 provides an illustration of using a single LO for receiving and transmitting signals in multiple RX and TX bands where the LO signal is within one of the RX bands, according to some embodiments of the present disclosure.
Figure 5:
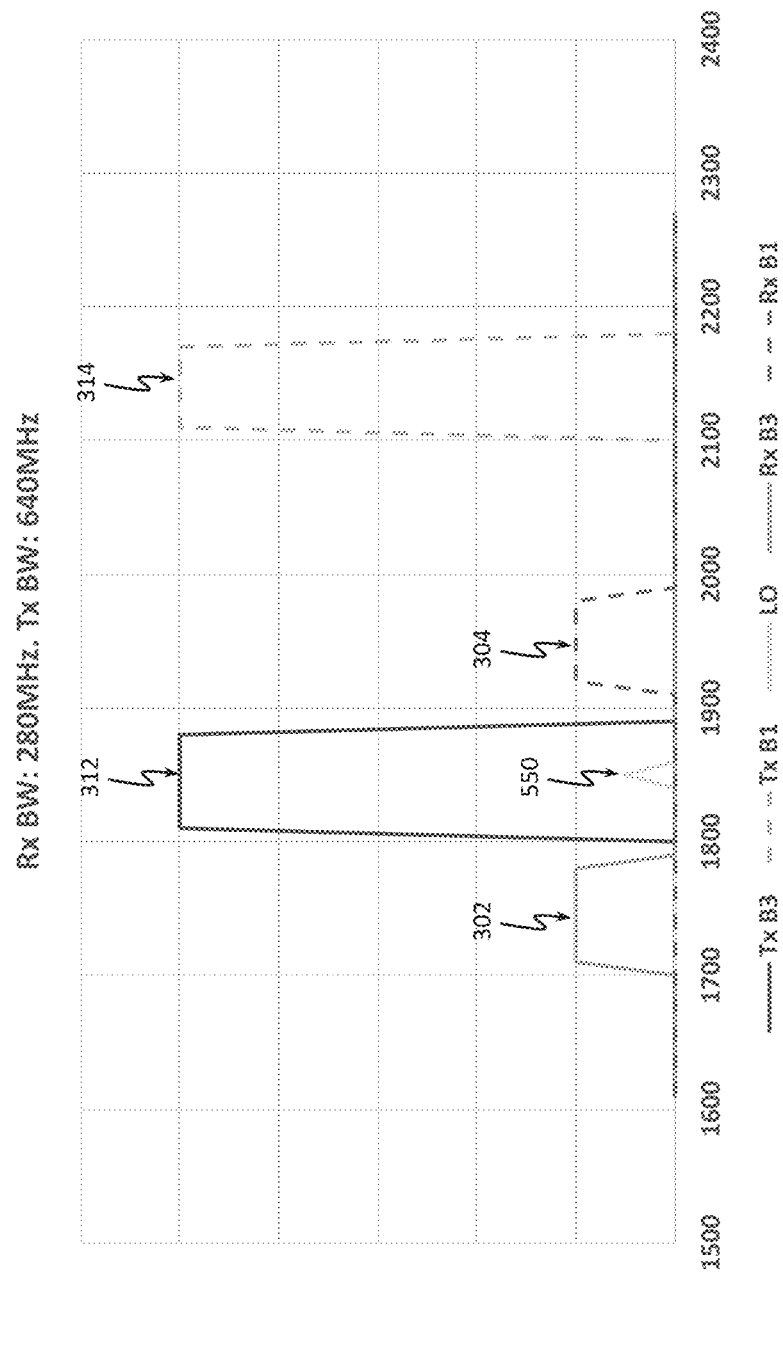
FIG. 5 provides an illustration of using a single LO for receiving and transmitting signals in multiple RX and TX bands where the LO signal is within one of the TX bands, according to some embodiments of the present disclosure.
Figure 6:
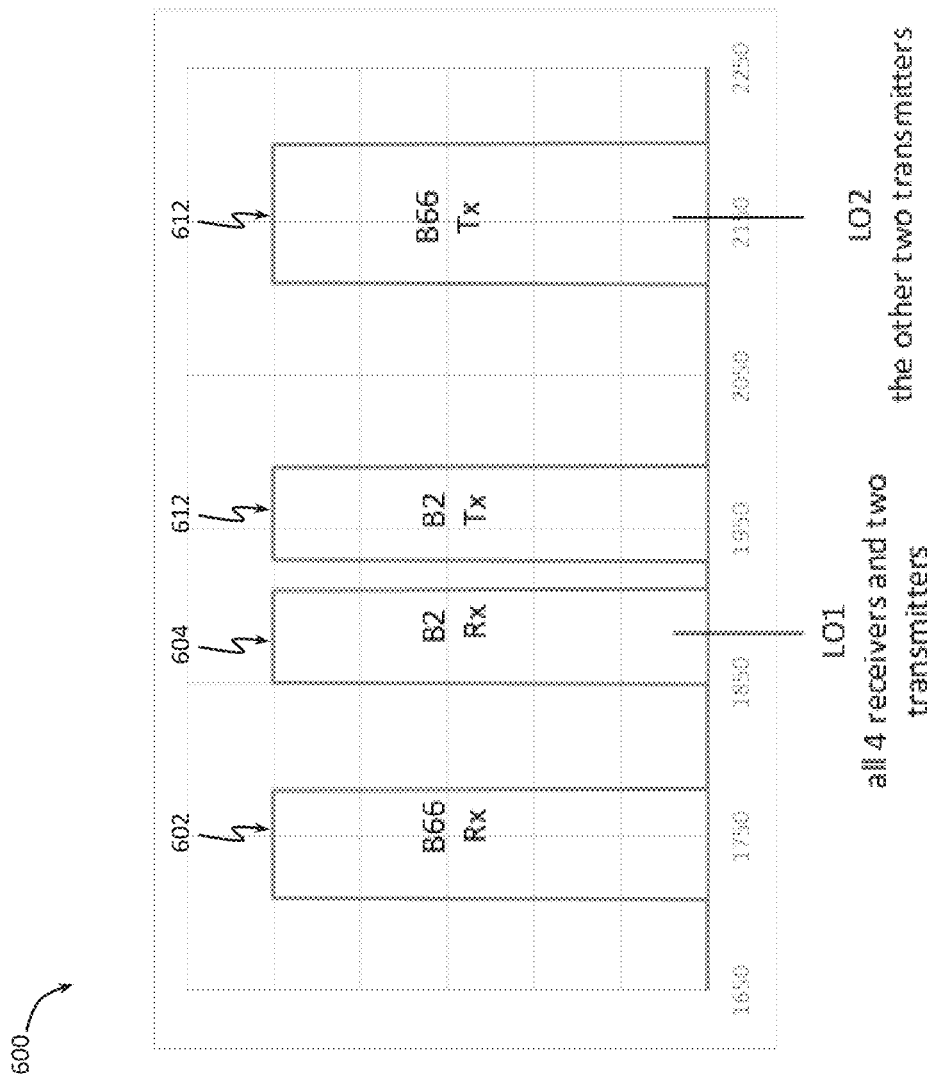
FIG. 6 provides an illustration of using two LOs for receiving and transmitting signals in multiple RX and TX bands, according to some embodiments of the present disclosure.

In general, the TRxBW may be a fraction of the LO signal frequency. For the example of FIG. 3, the TRxBW is 980 MHz and the LO signal frequency is 2.2 GHZ. In other examples, when the LO signal is around 1 GHZ, the TRxBW may be +/−250 MHz; when the LO signal is around 2 GHZ, the TRxBW may be +/−500 MHz; or when the LO signal is around 100 GHZ, the TRxBW may be +/−25 GHZ. Thus, for the LO 250 configured to generate an oscillation signal with a frequency LO, the lowest edge of the usable bandwidth of the transceiver (for the example of FIG. 3, the bottom of the lowest band, Rx B3) may be about LO−LO/4, while the highest edge of the usable bandwidth of the transceiver (for the example of FIG. 3, the top of the highest band, Tx B7) may be about LO+LO/4. For example, in some implementations, the difference between the top of the highest band of RF frequencies for which the FDD receiver 200 is designed (for the example of FIG. 3, the top of the highest band, Tx B7) and the LO frequency may be less than about 120 MHz, while the difference between the LO frequency and the bottom of the lowest band of RF frequencies for which the FDD receiver 200 is designed (for the example of FIG. 3, the bottom of the lowest band, Rx B3) and may be less than about 160 MHz. In general, these values may change depending on what the LO frequency is, so that each of 1) the difference between the top of the highest band of RF frequencies for which the FDD receiver 200 is designed and the LO frequency, and 2) the difference between the LO frequency and the bottom of the lowest band of RF frequencies for which the FDD receiver 200 is designed, may be less than about LO/4. It should be noted that the frequencies described with reference to FIG. 3, as well as with reference to FIGS. 4-6 provide examples only. For example, in other embodiments, TRxBW may be a larger fraction of the LO frequency than about LO/4.

FIG. 4 provides a graph 400, illustrating a different scenario. In particular, FIG. 4 illustrates that the transceiver 200 may need to be designed to handle a multi-band RF RX signal having signal components 302 and 304 and to handle a multi-band RF TX signal having signal components 312 and 314 as shown in FIG. 3 and described above (i.e., the signal components of 3GPP bands 3 and 1, respectively). Thus, there are less RF bands in the scenario of FIG. 4, compared to the scenario of FIG. 3, and the transceiver bandwidth TRxBW and the LO signal frequency LO may be correspondingly reduced. FIG. 4 illustrates a scenario in which the LO 250 may be configured to generate a LO signal 450 which, as shown in FIG. 4, may be within one of the RF frequency bands of interest, namely-within the RF band of the RX signal component 304. As can be seen from FIG. 4, or derived from the list of 3GPP bands, for the example shown in FIG. 4, the span of frequencies from the bottom of the lowest band (i.e., from the bottom of Rx B3) to the top of the highest band (i.e., to the top of Tx B1) is 460 MHZ, which, for this example is the minimum transceiver bandwidth that may be used for the transceiver 200, TRxBW. For the operating bands as shown in FIG. 4, the LO signal 450 generated by the LO 250 may be selected to be centered at the frequency of about 1.95 GHz.

The general design principles described above with reference to FIG. 3 are also applicable to FIG. 4. Namely, the TRxBW (460 MHz in the example of FIG. 4) is a fraction of the LO (1.95 GHz in the example of FIG. 4), and each of 1) the difference between the top of the highest band of RF frequencies for which the FDD receiver 200 is designed (for the example of FIG. 4, the top of the highest band, Tx B1) and the LO frequency (the frequency of the LO signal 450, which is 1.95 GHz in the example of FIG. 4), and 2) the difference between the LO frequency and the bottom of the lowest band of RF frequencies for which the FDD receiver 200 is designed (for the example of FIG. 4, the bottom of the lowest band, Rx B3), may be less than about LO/4 (i.e., less than about 487 MHz).

For the example shown in FIG. 4, the transceiver 200 may operate as follows. The LO 250 generates the LO signal 450. The RX quadrature mixer 220 mixes the LO signal 450 with the multi-band RF RX signal that includes the RX signal components 302 and 304 (i.e., components in two separate bands of RF RX frequencies) to generate a downconverted RX signal (not shown in FIG. 4) which is then provided to the ADC 224 for conversion to digital. The downconverted RX signal is also a multi-band signal, i.e., it also includes signal components in two separate bands, but each of the signal components 302 and 304 are shifted down by the center frequency LO signal 450, so that the downconverted RX signal is a signal of bandwidth TRxBW centered at DC (i.e., the downconverted RX signal is a signal ranging from −230 MHz, which is −TRxBW/2 for the example of FIGS. 4, to 230 MHz, which is TRxBW/2 for the example of FIG. 4). The TX quadrature mixer 240 mixes the same LO signal 450 with a TX signal (not shown in FIG. 4) to generate an upconverted multi-band RF TX signal that includes the TX signal components 312 and 314 (i.e., components in two separate bands of RF TX frequencies), which upconverted TX signal is then provided to the antenna 202 for the transmission. Similar to the upconverted TX signal shown in FIG. 4 with the signal components 312 and 314, the TX signal prior to upconversion (i.e., the signal which is not shown in FIG. 4) is also a multi-band signal, i.e., it also includes signal components in two separate bands, but the TX signal prior to upconversion is a signal of bandwidth TRxBW centered at DC (i.e., the TX signal prior to conversion is a signal ranging from −230 MHz to 230 MHz for the example of FIG. 4). The TX quadrature mixer 240 shifts each of the signal components of the TX signal prior to conversion up by the center frequency of the LO signal 450 to generate the upconverted RF TX signal with the signal components 312 and 314 as shown in FIG. 4. In contrast to the scenario of FIG. 3, because in the example of FIG. 4 the LO signal 450 does overlap within one of the RF bands, namely, the RX band Rx B1, the downconverted RX signal component of that band is a baseband signal (i.e., downconversion of that signal component with the LO signal 450 is a zero-IF conversion). The other RF signal components (i.e., the ones for which the LO signal 450 does not overlap or is included in the RF bands of) are low-IF signals as a result of their respective down- or upconversion using the LO signal 450.

FIG. 5 provides a graph 500, illustrates yet another different scenario. In particular, FIG. 5 illustrates that the transceiver 200 may need to be designed to handle a multi-band RF RX signal having signal components 302 and 304 and to handle a multi-band RF TX signal having signal components 312 and 314 as shown in FIG. 4 and described above (i.e., the signal components of 3GPP bands 3 and 1, respectively). In contrast to FIG. 4, FIG. 5 illustrates a scenario in which the LO 250 may be configured to generate a LO signal 550 which, as shown in FIG. 5, may be within one of the RF frequency bands of interest, namely-within the RF band of the TX signal component 312. As can be seen from FIG. 5, or derived from the list of 3GPP bands, for the example shown in FIG. 5, the span of frequencies from the bottom of the lowest band (i.e., from the bottom of Rx B3) to the top of the highest band (i.e., to the top of Tx B1) is 460 MHZ, which, for this example is the minimum transceiver bandwidth that may be used for the transceiver 200, TR×BW. For the operating bands as shown in FIG. 5, the LO signal 550 generated by the LO 250 may be selected to be centered at the frequency of about 1.87 GHz.

The general design principles described above with reference to FIGS. 3 and 4 are also applicable to FIG. 5. Namely, the TR×BW (460 MHz in the example of FIG. 5) may be a fraction of the LO (1.87 GHz in the example of FIG. 5), and each of 1) the difference between the top of the highest band of RF frequencies for which the FDD receiver 200 is designed (for the example of FIG. 5, the top of the highest band, Tx B1) and the LO frequency (the frequency of the LO signal 550, which is 1.87 GHz in the example of FIG. 5), and 2) the difference between the LO frequency and the bottom of the lowest band of RF frequencies for which the FDD receiver 200 is designed (for the example of FIG. 5, the bottom of the lowest band, Rx B3), may be less than about LO/4 (i.e., less than about 467 MHZ). It should be noted that FIG. 5 illustrates an example where the bandwidth of the receiver (R×BW) is not the same as the bandwidth of the transmitter (T×BW).

For the example shown in FIG. 5, the transceiver 200 may operate as follows. The LO 250 generates the LO signal 550. The RX quadrature mixer 220 mixes the LO signal 550 with the multi-band RF RX signal that includes the RX signal components 302 and 304 (i.e., components in two separate bands of RF RX frequencies) to generate a downconverted RX signal (not shown in FIG. 5) which is then provided to the ADC 224 for conversion to digital. The downconverted RX signal is also a multi-band signal, i.e., it also includes signal components in two separate bands, but each of the signal components 302 and 304 are shifted down by the center frequency LO signal 550, so that the downconverted RX signal is a signal of bandwidth TR×BW centered at DC (i.e., the downconverted RX signal is a signal ranging from −230 MHz, which is −TR×BW/2 for the example of FIGS. 5, to 230 MHZ, which is TR×BW/2 for the example of FIG. 5). The TX quadrature mixer 240 mixes the same LO signal 550 with a TX signal (not shown in FIG. 5) to generate an upconverted multi-band RF TX signal that includes the TX signal components 312 and 314 (i.e., components in two separate bands of RF TX frequencies), which upconverted TX signal is then provided to the antenna 202 for the transmission. Similar to the upconverted TX signal shown in FIG. 5 with the signal components 312 and 314, the TX signal prior to upconversion (i.e., the signal which is not shown in FIG. 5) is also a multi-band signal, i.e., it also includes signal components in two separate bands, but the TX signal prior to upconversion is a signal of bandwidth TR×BW centered at DC (i.e., the TX signal prior to conversion is a signal ranging from −230 MHz to 230 MHz for the example of FIG. 5). The TX quadrature mixer 240 shifts each of the signal components of the TX signal prior to conversion up by the center frequency of the LO signal 550 to generate the upconverted RF TX signal with the signal components 312 and 314 as shown in FIG. 5. In contrast to the scenario of FIG. 3, because in the example of FIG. 5 the LO signal 550 does overlap within one of the RF bands, namely, the TX band Tx B3, the downconverted TX signal component of that band is a baseband signal (i.e., downconversion of that signal component with the LO signal 550 is a zero-IF conversion). The other RF signal components (i.e., the ones for which the LO signal 550 does not overlap or is included in the RF bands of) are low-IF signals as a result of their respective down- or upconversion using the LO signal 550.

FIG. 6 provides a graph 600, illustrating a further scenario. In particular, FIG. 6 illustrates that the transceiver 200 may need to be designed to handle a multi-band RF RX signal having signal components 602 and 604 and to handle a multi-band RF TX signal having signal components 612 and 614. The signal components 602 and 612 may be, respectively, RX and TX bands of 3GPP band 66, which is the widest band at 70 MHz, where 3GPP bands 4 and 10 are subsets of band 66. The signal components 604 and 614 may be, respectively, RX and TX bands of 3GPP band 2. As can be seen from FIG. 6, or derived from the list of 3GPP bands, for the example shown in FIG. 6, the span of frequencies from the bottom of the lowest band (i.e., from the bottom of Rx B66) to the top of the highest band (i.e., to the top of Tx B66) is 510 MHz. This may be too much, or too complex, to support with a single LO. Therefore, in such a scenario, two LOs may be used. A first LO may generate an oscillation signal with a frequency LO1, as shown in FIG. 6, which may be used to mix with the received RF signals at all four receivers of the scenario of FIG. 6 (i.e., the receivers receiving RF signals in 3GPP bands 2 and 66) and to mix the transmitted TX signals at two of the four transmitters of this scenario (i.e., the transmitters transmitting RF signals in 3GPP band 2), and a second LO may generate an oscillation signal with a frequency LO2, shown in FIG. 6, which may be used to mix the transmitted TX signals at the other two of the four transmitters of this scenario (i.e., the transmitters transmitting RF signals in 3GPP band 66. Thus, in the scenario of FIG. 6, the band 66 transmitter works as in normal zero-IF mode and uses one of the local oscillators, namely the one generating the LO signal LO2. Receivers in bands 2 and 66 and transmitters of the band 2 share the other local oscillator (LO1).

Figure 7:
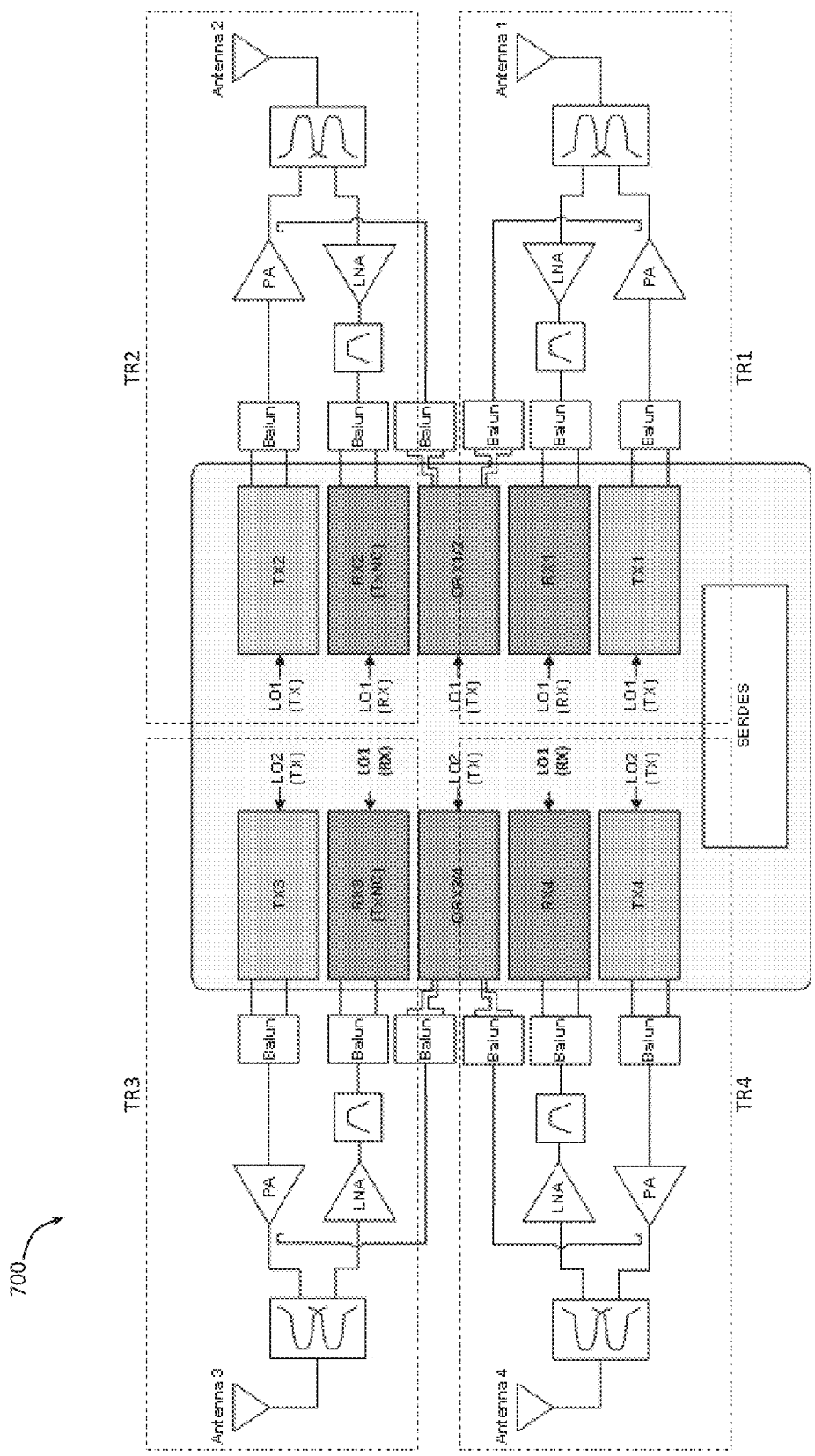
FIG. 7 provides a block diagram illustrating an example RF transceiver using two LOs for receiving and transmitting signals in multiple RX and TX bands, according to some embodiments of the present disclosure.

The chip configuration for the scenario of FIG. 6 is shown as a multi-band FDD RF transceiver 700 shown in FIG. 7. The transceiver 700 includes four RF transceivers, the approximate outlines of which are shown with the dashed outlines and labels TR1, TR2, TR3, and TR 4. Each of the transceivers TR1, TR2, TR3, and TR 4 may be the RF transceiver 200 as described above (which can be seen in FIG. 7 showing analogous components to those shown in FIG. 2), except that the configuration and sharing of the signals of the LO 250 may be different. Namely, as shown in FIG. 7, a first LO (LO1) may be used in quadrature mixers of all four receivers (i.e., the receivers of the RF transceivers TR1, TR2, TR3, and TR 4) and in quadrature mixers of two of the four transmitters (as shown in FIG. 7, in the transmitters of the RF transceivers TR1 and TR2), while a second LO (LO2) may be used in quadrature mixers of the remaining two of the four transmitters (i.e., in the transmitters of the RF transceivers TR3 and TR4).

Example Data Processing System

FIG. 8 provides a block diagram illustrating an example data processing system 800 that may be configured to implement at least portions of the controller 270 which may be used to control operation of the multi-band FDD transceiver, e.g., the transceiver 200 or 700, according to some embodiments of the present disclosure.

As shown in FIG. 8, the data processing system 800 may include at least one processor 802, e.g., a hardware processor 802, coupled to memory elements 804 through a system bus 806. As such, the data processing system may store program code within memory elements 804. Further, the processor 802 may execute the program code accessed from the memory elements 804 via a system bus 806. In one aspect, the data processing system may be implemented as a computer that is suitable for storing and/or executing program code. It should be appreciated, however, that the data processing system 800 may be implemented in the form of any system including a processor and a memory that is capable of performing the functions described within this disclosure.

In some embodiments, the processor 802 can execute software or an algorithm to perform the activities as discussed in this specification, in particular activities related to operation of one or more FDD transceivers using one or more LOs shared among multiple RX and/or TX bands. The processor 802 may include any combination of hardware, software, or firmware providing programmable logic, including by way of non-limiting example a microprocessor, a digital signal processor (DSP), a field-programmable gate array (FPGA), a programmable logic array (PLA), an application specific IC (ASIC), or a virtual machine processor. The processor 802 may be communicatively coupled to the memory element 804, for example in a direct-memory access (DMA) configuration, so that the processor 802 may read from or write to the memory elements 804.

In general, the memory elements 804 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the data processing system 800 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures, e.g., the ADCs 224, the DACs 244, or other elements/components shown in FIG. 2 or 7, can also include suitable interfaces for receiving, transmitting, and/or otherwise communicating data or information in a network environment so that they can communicate with, e.g., the data processing system 800 implementing the controller 270.

In certain example implementations, mechanisms for operation of one or more FDD transceivers using one or more LOs shared among multiple RX and/or TX bands as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as, the memory elements 804 shown in FIG. 8, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as, the processor 802 shown in FIG. 8, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 804 may include one or more physical memory devices such as, for example, local memory 808 and one or more bulk storage devices 810. The local memory may refer to RAM or other non-persistent memory device(s) generally used during actual execution of the program code. A bulk storage device may be implemented as a hard drive or other persistent data storage device. The processing system 800 may also include one or more cache memories (not shown) that provide temporary storage of at least some program code in order to reduce the number of times program code must be retrieved from the bulk storage device 810 during execution.

As shown in FIG. 8, the memory elements 804 may store an application 818. In various embodiments, the application 818 may be stored in the local memory 808, the one or more bulk storage devices 810, or apart from the local memory and the bulk storage devices. It should be appreciated that the data processing system 800 may further execute an operating system (not shown in FIG. 8) that can facilitate execution of the application 818. The application 818, being implemented in the form of executable program code, can be executed by the data processing system 800, e.g., by the processor 802. Responsive to executing the application, the data processing system 800 may be configured to perform one or more operations or method steps described herein.

Input/output (I/O) devices depicted as an input device 812 and an output device 814, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 814 may be any type of screen display, such as plasma display, liquid crystal display (LCD), organic light emitting diode (OLED) display, electroluminescent (EL) display, or any other indicator, such as a dial, barometer, or LEDs. In some implementations, the system may include a driver (not shown) for the output device 814. Input and/or output devices 812, 814 may be coupled to the data processing system either directly or through intervening I/O controllers.

In an embodiment, the input and the output devices may be implemented as a combined input/output device (illustrated in FIG. 8 with a dashed line surrounding the input device 812 and the output device 814). An example of such a combined device is a touch sensitive display, also sometimes referred to as a "touch screen display" or simply "touch screen". In such an embodiment, input to the device may be provided by a movement of a physical object, such as, a stylus or a finger of a user, on or near the touch screen display.

A network adapter 816 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 800, and a data transmitter for transmitting data from the data processing system 800 to said systems, devices and/or networks. Modems, cable modems, and Ethernet cards are examples of different types of network adapter that may be used with the data processing system 800.

Select Examples

Example 1 provides a multi-band FDD transceiver system that includes a LO, a receive (RX) quadrature mixer (i.e., a mixer in the RX path that is configured to perform quadrature mixing of signals, the RX quadrature mixer also commonly referred to as a downconverter), and a transmit (TX) quadrature mixer (i.e., a mixer in the TX path, also commonly referred to as an upconverter). The LO is configured to provide a LO signal. The RX quadrature mixer is configured to mix the LO signal with a received RF signal to generate a downconverted RX signal, where the received RF signal includes a first received signal component in a first band of RF receiver frequencies and a second received signal component in a second band of RF receiver frequencies, the second band of receiver frequencies being separate from (i.e., being non-overlapping and non-continuous with) the first band of receiver frequencies. The TX quadrature mixer is configured to mix the LO signal with a TX signal to generate an upconverted RF TX signal, where the upconverted TX signal includes a first upconverted TX signal component in a first band of transmitter frequencies and a second upconverted TX signal component in a second band of transmitter frequencies, the second band of transmitter frequencies being separate from (i.e., being non-overlapping and non-continuous with) each one of the first band of transmitter frequencies, the first band of receiver frequencies, and the second band of receiver frequencies.

Example 2 provides the multi-band FDD transceiver system according to example 1, where a center frequency of the LO signal is within the first band of receiver frequencies (i.e., the first receiver signal component is downconverted to baseband, i.e., a zero-IF conversion, as a result of being mixed with the LO signal).

Example 3 provides the multi-band FDD transceiver system according to example 1, where a center frequency of the LO signal is within the first band of transmitter frequencies (i.e., the first upconverted TX signal component prior to the upconversion is a baseband signal component).

Example 4 provides the multi-band FDD transceiver system according to any one of the preceding examples, where the downconverted RX signal includes an in-phase RX signal component and a quadrature RX signal component, and the RX quadrature mixer includes a first RX path mixer and a second RX path mixer, where the first RX path mixer is configured to generate the in-phase RX signal component based on the received RF signal and an in-phase component of the LO signal (i.e., cos (LO)), and the second RX path mixer is configured to generate the quadrature RX signal component based on the received RF signal and a quadrature component of the LO signal (i.e., sin (LO), or a component that is offset in phase from the in-phase component of the LO signal by 90 degrees).

Example 5 provides the multi-band FDD transceiver system according to example 4, further including a first ADC, configured to convert the in-phase RX signal component to a digital in-phase RX signal component, and also including a second ADC, configured to convert the quadrature RX signal component to a digital quadrature RX signal component.

Example 6 provides the multi-band FDD transceiver system according to example 5, further including a first band-pass filter (BPF), having an input coupled to an output of the first RX path mixer, and having an output coupled to an input of the first ADC (i.e., configured to filter an output of the first RX path mixer to generate a filtered in-phase RX signal component for conversion by the first ADC); and a second BPF, having an input coupled to an output of the second RX path mixer, and having an output coupled to an input of the second ADC (i.e., configured to filter an output of the second RX path mixer to generate a filtered in-phase RX signal component for conversion by the second ADC).

Example 7 provides the multi-band FDD transceiver system according to any one of the preceding examples, where the upconverted TX signal includes an in-phase upconverted TX signal component and a quadrature upconverted TX signal component, and the TX quadrature mixer includes a first TX path mixer and a second TX path mixer, where the first TX path mixer is configured to generate the in-phase upconverted TX signal component based on the TX signal and an in-phase component of the LO signal (i.e., cos (LO)), and the second TX path mixer is configured to generate the quadrature upconverted TX signal component based on the TX signal and a quadrature component of the LO signal (i.e., sin (LO)).

Example 8 provides the multi-band FDD transceiver system according to example 7, further including a first DAC, configured to convert a digital in-phase TX signal component to an analog in-phase TX signal component, where the first TX path mixer is configured to generate the in-phase upconverted TX signal component based on the analog in-phase TX signal component; and a second DAC, configured to convert a digital quadrature TX signal component to an analog quadrature TX signal component, where the second TX path mixer is configured to generate the quadrature upconverted TX signal component based on the analog quadrature TX signal component.

Example 9 provides the multi-band FDD transceiver system according to example 8, further including a first BPF, having an input coupled to an output of the first DAC, and having an output coupled to an input of the first TX path mixer (i.e., configured to filter an output of the first DAC prior to providing it for mixing at the first TX path mixer); and a second BPF, having an input coupled to an output of the second DAC, and having an output coupled to an input of the second TX path mixer (i.e., configured to filter an output of the second DAC prior to providing it for mixing at the second TX path mixer).

Example 10 provides the multi-band FDD transceiver system according to any one of the preceding examples, where the RX quadrature mixer mixing the LO signal with the received RF signal includes the RX quadrature mixer performing a quadrature downconversion to generate the downconverted RX signal, and the TX quadrature mixer mixing the LO signal with the TX signal includes the TX quadrature mixer performing a quadrature upconversion to generate the upconverted TX signal.

Example 11 provides the multi-band FDD transceiver system according to any one of the preceding examples, where a difference between a frequency of the LO signal and a smallest frequency of the received RF signal (e.g., the smallest frequency of the first band of receiver frequencies and the second band of receiver frequencies) is less than 160 megahertz.

Example 12 provides the multi-band FDD transceiver system according to any one of the preceding examples, where a difference between a frequency of the LO signal and a largest frequency of the upconverted TX signal (e.g., the largest frequency of the first band of transceiver frequencies and the second band of transceiver frequencies) is less than 120 megahertz.

Example 13 provides the multi-band FDD transceiver system according to any one of examples 1-12, further including a further LO, configured to provide a further LO signal; a further TX path mixer, configured to mix the further LO signal with a further TX signal to generate a further mixed TX signal.

Example 14 provides the multi-band FDD transceiver system according to any one of examples 1-12, further including a further LO, configured to provide a further LO signal; a further RX path mixer, configured to mix the further LO signal with a further RX signal to generate a further mixed RX signal.

Example 15 provides the multi-band FDD transceiver system according to any one of the preceding examples, further including an LNA, configured to amplify the received RF signal prior to the RX path mixer mixing the LO signal with the received RF signal, and/or a power amplifier, configured to amplify the upconverted TX signal.

Example 16 provides a multi-band FDD transceiver that includes a first LO, configured to provide a first LO signal; a second LO, configured to provide a second LO signal; a first receive (RX) path mixer, configured to mix the first LO signal with a first RX signal to generate a first mixed RX signal; a second RX path mixer, configured to mix the first LO signal with a second RX signal to generate a second mixed RX signal; a first transmit (TX) path mixer, configured to mix the first LO signal with a first TX signal to generate a first mixed TX signal; and a second TX path mixer, configured to mix the second LO signal with a second TX signal to generate a second mixed TX signal.

Example 17 provides the multi-band FDD transceiver system according to example 16, where each of the first RX signal, the second RX signal, the first TX signal, and the second TX signal is in a respective different band of frequencies.

Example 18 provides the multi-band FDD transceiver system according to examples 16 or 17, further including: a third RX path mixer, configured to mix the first LO signal with a third RX signal to generate a third mixed RX signal; and a third TX path mixer, configured to mix the first LO signal with a third TX signal to generate a third mixed TX signal.

Example 19 provides the multi-band FDD transceiver system according to example 18, further including: a fourth RX path mixer, configured to mix the first LO signal with a fourth RX signal to generate a fourth mixed RX signal; and a fourth TX path mixer, configured to mix the second LO signal with a fourth TX signal to generate a fourth mixed TX signal.

Example 20 provides a non-transitory computer-readable storage medium including instructions for execution which, when executed by a processor, are operable to perform operations including: controlling that a LO generates a LO signal; controlling that a receive (RX) path mixer mixes the LO signal with a received RF signal to generate a downconverted RX signal, where the received RF signal includes a first received signal component in a first band of RF receiver frequencies and a second received signal component in a second band of RF receiver frequencies, the second band of receiver frequencies being separate from (i.e., being non-overlapping and non-continuous with) the first band of receiver frequencies; and controlling that a transmit (TX) path mixer mixes the LO signal with a TX signal to generate an upconverted RF TX signal, where the upconverted TX signal includes a first upconverted TX signal component in a first band of transmitter frequencies and a second upconverted TX signal component in a second band of transmitter frequencies, the second band of transmitter frequencies being separate from (i.e., being non-overlapping and non-continuous with) each one of the first band of transmitter frequencies, the first band of receiver frequencies, and the second band of receiver frequencies.

In further examples, the non-transitory computer-readable storage medium according to example 20 may further include instructions operable to perform operations performed by any parts of the multi-band FDD transceiver system in accordance with any one of the preceding examples.

VARIATIONS AND IMPLEMENTATIONS

While embodiments of the present disclosure were described above with references to exemplary implementations as shown in FIGS. 1-8, a person skilled in the art will realize that the various teachings described above are applicable to a large variety of other implementations. For example, the same principles may be applied with two or more LOs each supporting receivers and transmitters in groups of bands. In some embodiments, the LOs may be derived from a single frequency source that is followed by different dividers.

In certain contexts, the features discussed herein can be applicable to automotive systems, safety-critical industrial applications, medical systems, scientific instrumentation, wireless and wired communications, radio, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind).

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions.

In the discussions of the embodiments above, components of a system, such as, clocks, multiplexers, buffers, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure related to virtual dithering.

Parts of various systems for sharing one or more LOs shared among multiple RX and/or TX bands in a multi-band FDD transceiver as proposed herein can include electronic circuitry to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed-signal domain. In some instances, the processor may be configured to carrying out the functions described herein by executing one or more instructions stored on a non-transitory computer-readable storage medium.

In one example embodiment, any number of electrical circuits of the present figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present figures may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package.

It is also imperative to note that all of the specifications, dimensions, and relationships outlined herein (e.g., the number of components of the transceivers shown in FIGS. 2 and 7, and/or the number and values of RF bands shown in FIGS. 3-6, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the present FIGS. may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the present figures and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to operation of one or more FDD transceivers using one or more LOs shared among multiple RX and/or TX bands as proposed herein illustrate only some of the possible functions that may be executed by, or within, system illustrated in the present figures. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Note that all optional features of the apparatus described above may also be implemented with respect to the method or process described herein and specifics in the examples may be used anywhere in one or more embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Although the claims are presented in single dependency format in the style used before the USPTO, it should be understood that any claim can depend on and be combined with any preceding claim of the same type unless that is clearly technically infeasible.

The invention claimed is:

1. A multi-band frequency division duplex (FDD) transceiver system, comprising:
   a local oscillator (LO), to provide a LO signal;
   a receive (RX) mixer, to mix, in analog domain, the LO signal with a received radio frequency (RF) signal to generate a downconverted RX signal, where the received RF signal includes a first received signal component in a first band of receiver frequencies and a second received signal component in a second band of receiver frequencies, the second band of receiver frequencies having a central frequency that is different from a central frequency of the first band of receiver frequencies, and the downconverted RX signal having a bandwidth that includes signal components associated with the first and second bands of receiver frequencies;
   a receive filter, to filter the downconverted RX signal having the bandwidth that includes the signal components associated with the first and second bands of receiver frequencies, the receive filter having an input coupled to an output of the RX mixer, and an output signal provided by the receive filter having signal components associated with the first and second bands of receiver frequencies; and
   a transmit (TX) mixer, to mix, in analog domain, the LO signal with a TX signal to generate an upconverted TX signal, where the upconverted TX signal includes a first upconverted TX signal component in a first band of transmitter frequencies and a second upconverted TX signal component in a second band of transmitter frequencies, the second band of transmitter frequencies having a central frequency that is different from a central frequency of the first band of transmitter frequencies, the central frequency of the first band of receiver frequencies, and the central frequency of the second band of receiver frequencies,
   wherein a frequency of the LO signal is substantially same when the RX mixer mixes the LO signal with the received RF signal and when the TX mixer mixes the LO signal with the TX signal.

2. The multi-band FDD transceiver system according to claim 1, wherein the frequency of the LO signal is within one of the first band of receiver frequencies, the second band of receiver frequencies, the first band of transmitter frequencies, and the second band of transmitter frequencies.

3. The multi-band FDD transceiver system according to claim 1, wherein the frequency of the LO signal is outside each of the first band of receiver frequencies, the second band of receiver frequencies, the first band of transmitter frequencies, and the second band of transmitter frequencies.

4. The multi-band FDD transceiver system according to claim 1, wherein:
   the downconverted RX signal includes an in-phase RX signal component and a quadrature RX signal component, and
   the RX mixer includes a first RX path mixer and a second RX path mixer, where:
      the first RX path mixer is to generate the in-phase RX signal component based on the received RF signal and an in-phase component of the LO signal, and
      the second RX path mixer is to generate the quadrature RX signal component based on the received RF signal and a quadrature component of the LO signal.

5. The multi-band FDD transceiver system according to claim 4, further comprising:
   a first analog-to-digital converter (ADC), to convert the in-phase RX signal component to a digital in-phase RX signal component; and
   a second ADC, to convert the quadrature RX signal component to a digital quadrature RX signal component.

6. The multi-band FDD transceiver system according to claim 5, further comprising:
   a second filter, having an input coupled to an output of the second RX path mixer, and having an output coupled to an input of the second ADC,
   wherein the output of the RX mixer is an output of the first RX path mixer, and wherein the receive filter has an output coupled to the first ADC.

7. The multi-band FDD transceiver system according to claim 1, wherein:
   the upconverted TX signal includes an in-phase upconverted TX signal component and a quadrature upconverted TX signal component, and
   the TX mixer includes a first TX path mixer and a second TX path mixer, where:
      the first TX path mixer is to generate the in-phase upconverted TX signal component based on the TX signal and an in-phase component of the LO signal, and
      the second TX path mixer is to generate the quadrature upconverted TX signal component based on the TX signal and a quadrature component of the LO signal.

8. The multi-band FDD transceiver system according to claim 7, further comprising:
   a first digital-to-analog converter (DAC), to convert a digital in-phase TX signal component to an analog in-phase TX signal component, where the first TX path mixer is to generate the in-phase upconverted TX signal component based on the analog in-phase TX signal component; and
   a second DAC, to convert a digital quadrature TX signal component to an analog quadrature TX signal component, where the second TX path mixer is to generate the quadrature upconverted TX signal component based on the analog quadrature TX signal component.

9. The multi-band FDD transceiver system according to claim 8, further comprising:
   a first filter, having an input coupled to an output of the first DAC, and having an output coupled to an input of the first TX path mixer; and a second filter, having an input coupled to an output of the second DAC, and having an output coupled to an input of the second TX path mixer.

10. The multi-band FDD transceiver system according to claim 1, wherein:
the RX mixer mixing the LO signal with the received RF signal includes the RX mixer performing a quadrature downconversion to generate the downconverted RX signal, and
the TX mixer mixing the LO signal with the TX signal includes the TX mixer performing a quadrature upconversion to generate the upconverted TX signal.

11. The multi-band FDD transceiver system according to claim 1, wherein a difference between the frequency of the LO signal and a smallest frequency of the received RF signal is less than 160 megahertz.

12. The multi-band FDD transceiver system according to claim 1, wherein a difference between the frequency of the LO signal and a largest frequency of the upconverted TX signal is less than 120 megahertz.

13. The multi-band FDD transceiver system according to claim 1, further including:
a further LO, to provide a further LO signal;
a further TX path mixer, to mix, in analog domain, the further LO signal with a further TX signal to generate a further mixed TX signal.

14. The multi-band FDD transceiver system according to claim 1, further including:
a further LO, to provide a further LO signal;
a further RX path mixer, to mix, in analog domain, the further LO signal with a further RX signal to generate a further mixed RX signal.

15. The multi-band FDD transceiver system according to claim 1, further comprising:
a low-noise amplifier (LNA), to amplify the received RF signal prior to the RX mixer mixing the LO signal with the received RF signal, and/or
a power amplifier, to amplify the upconverted TX signal.

16. A multi-band frequency division duplex (FDD) transceiver system, comprising:
a first local oscillator (LO), to provide a first LO signal;
a second LO, to provide a second LO signal;
a first receive (RX) path mixer, to mix, in analog domain, the first LO signal with a first RX signal to generate a first mixed RX signal;
a first filter, to filter the first mixed RX signal, the first filter having an input coupled to an output of the first RX path mixer, and an output signal provided by the first filter having signal components associated with first and second bands of receiver frequencies;
a second RX path mixer, to mix, in analog domain, the first LO signal with a second RX signal to generate a second mixed RX signal;
a second filter, to filter the second mixed RX signal, the second filter having an input coupled to an output of the second RX path mixer, and an output signal provided by the second filter having signal components associated with at least two bands of receiver frequencies, wherein the output signal provided by the second filter is associated with different frequency bands than the output signal provided by the first filter;
a first transmit (TX) path mixer, to mix, in analog domain, the first LO signal with a first TX signal to generate a first mixed TX signal; and
a second TX path mixer, to mix, in analog domain, the second LO signal with a second TX signal to generate a second mixed TX signal, wherein:
each of the first RX signal, the second RX signal, the first TX signal, and the second TX signal is in a respective different band of frequencies, and
a frequency of the first LO signal is to be substantially same when the first RX path mixer mixes the first LO signal with the first RX signal to generate the first mixed RX signal, the second RX path mixer mixes the first LO signal with the second RX signal to generate the second mixed RX signal, and the first TX path mixer mixes the first LO signal with the first TX signal to generate the first mixed TX signal.

17. The multi-band FDD transceiver system according to claim 16, further including:
a third RX path mixer, to mix, in analog domain, the first LO signal with a third RX signal to generate a third mixed RX signal; and
a third TX path mixer, to mix, in analog domain, the first LO signal with a third TX signal to generate a third mixed TX signal.

18. The multi-band FDD transceiver system according to claim 17, further including:
a fourth RX path mixer, to mix, in analog domain, the first LO signal with a fourth RX signal to generate a fourth mixed RX signal; and
a fourth TX path mixer, to mix, in analog domain, the second LO signal with a fourth TX signal to generate a fourth mixed TX signal.

19. A non-transitory computer-readable storage medium comprising instructions for execution which, when executed by a processor, are operable to perform operations comprising:
controlling that a receive (RX) path mixer mixes, in analog domain, a local oscillator (LO) signal with a received radio frequency (RF) signal to generate a downconverted RX signal, where the received RF signal includes a first received signal component in a first band of receiver frequencies and a second received signal component in a second band of receiver frequencies, the second band of receiver frequencies having a central frequency that is different from a central frequency of the first band of receiver frequencies;
controlling that a receive filter filters the downconverted RX signal and provides an output signal having signal components associated with the first and second bands of receiver frequencies; and
controlling that a transmit (TX) path mixer mixes, in analog domain, the LO signal with a TX signal to generate an upconverted TX signal, where the upconverted TX signal includes a first upconverted TX signal component in a first band of transmitter frequencies and a second upconverted TX signal component in a second band of transmitter frequencies, the second band of transmitter frequencies having a central frequency that is different from a central frequency of the first band of transmitter frequencies, the central frequency of the first band of receiver frequencies, and the central frequency of the second band of receiver frequencies,
wherein a frequency of the LO signal is to be substantially same when the RX path mixer mixes the LO signal with the received RF signal to generate the downconverted RX signal and when the TX path mixer mixes the LO signal with the TX signal to generate the upconverted TX signal.

20. The non-transitory computer-readable storage medium according to claim 19, wherein a difference between the frequency of the LO signal and a smallest frequency of the received RF signal is less than 160 megahertz, or a difference between the frequency of the LO signal and a largest frequency of the upconverted TX signal is less than 120 megahertz.

\* \* \* \* \*